United States Patent Office 3,395,651
Patented Aug. 6, 1968

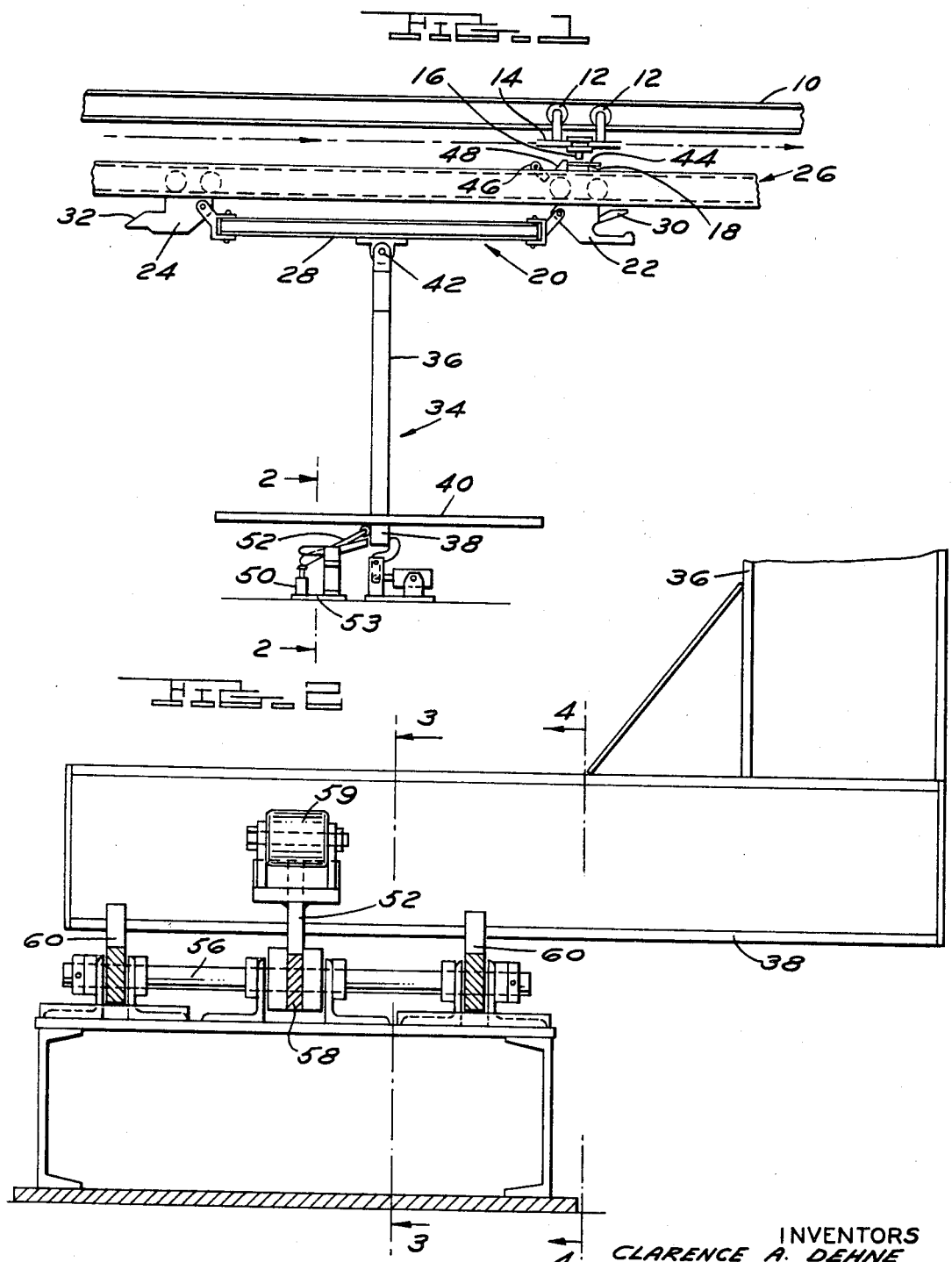

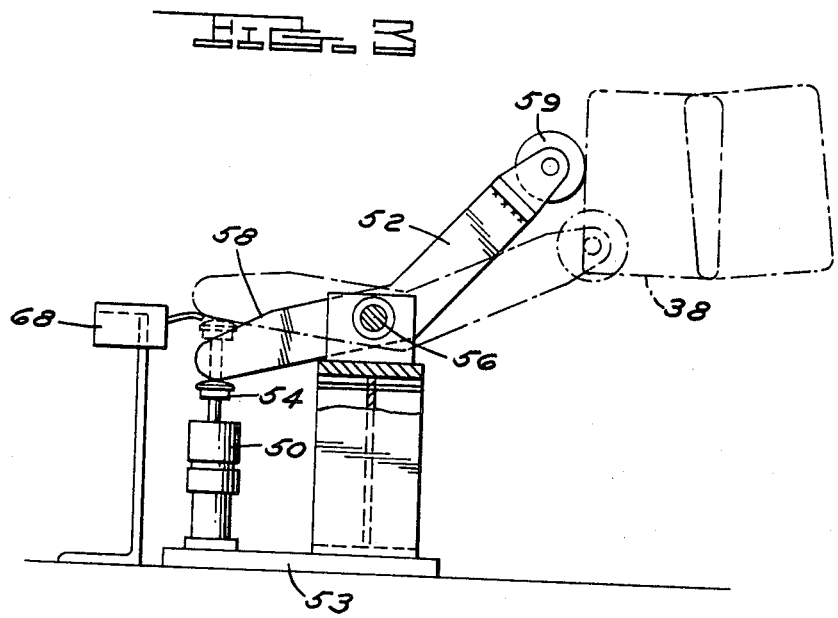
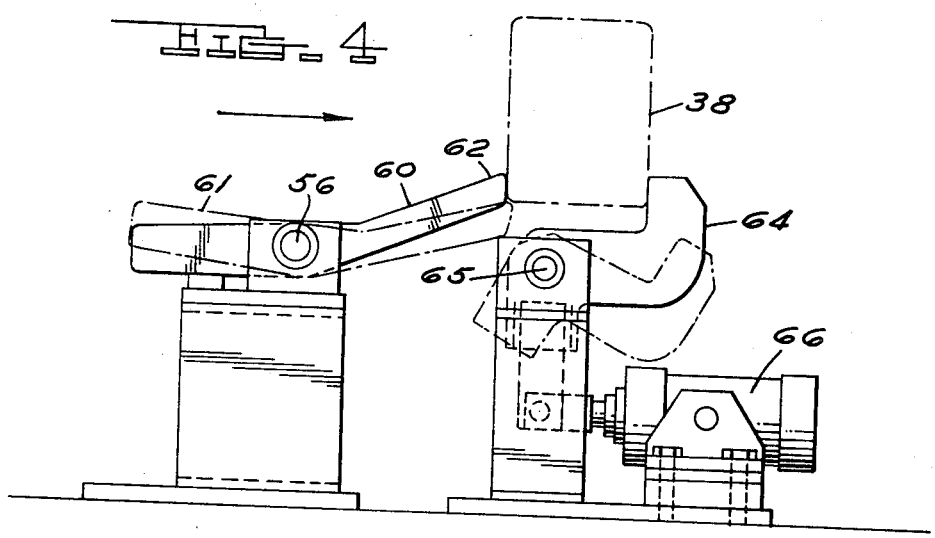

3,395,651
APPARATUS FOR STOPPING SUSPENDED
CONVEYOR CARRIERS
Clarence A. Dehne, Orchard Lake, and Harold A. Folsom, Jr., Livonia, Mich., assignors to Jervis B. Webb Company, a corporation of Michigan
Filed Oct. 24, 1966, Ser. No. 588,960
9 Claims. (Cl. 104—249)

This invention relates to improved apparatus for stopping carriers of a power and free conveyor, particularly carriers of the type having a load carrying portion which is suspended from a trolley or load bar for free swinging movement about a pivotal axis extending transversely to the direction of the conveyor travel.

Carriers of this type are propelled along a supporting track by a pusher of a driven chain engaging a drive dog on the carrier, and it is frequently desirable to disengage the drive dog from the pusher and stop the carrier at a station where some operation is to be performed. When the carrier is stopped, the pivotally suspended load carrying portion thereof will for a time rock pendulously forward and backward, and this rocking movement is difficult to eliminate without imposing a shock on the load carrying portion and any load being carried thereon.

The object of the present invention is to provide apparatus for arresting movement of a conveyor carrier of this type, not only of the carrier as a whole but also rocking movement of the load carrying portion thereof. A further object is to provide apparatus which will arrest rocking movement with minimal shock loading, utilizing the pendulous motion of the load carrying portion of the carrier in absorbing the momentum thereof.

The apparatus provided by the invention for arresting movement of a carrier of the type described above comprises a stop means for disengaging the carrier drive dog from the pusher propelling the carrier and stopping the carrier resulting in forward and backward rocking movement of the load carrying portion of the carrier about its pivotal suspension; a motion damping device operable on the first rocking movement of the load carrying portion in the backward direction to restrain backward rocking movement of the load carrying portion of the carrier; and mechanism for arresting rocking movement of the load carrying portion of the carrier which is operable in response to operation of the motion damping device.

Other features and advantages of the invention will appear from the following description of the embodiment thereof disclosed in the accompanying drawings in which:

FIGURE 1 is a side elevation of a power and free conveyor showing a carrier stopped by the apparatus of the invention;

FIGURE 2 is an end elevation on an enlarged scale, taken as indicated by the line 2—2 of FIG. 1; and FIGURES 3 and 4 are sectional elevations respectively taken as indicated by the lines 3—3 and 4—4 of FIG. 2.

Referring to FIGS. 1 and 2, the conveyor structure shown is of the overhead power and free type including a track 10 for trolleys 12 which support a chain 14 equipped with pushers 16. The pushers 16 are adapted to engage a drive dog 18 of a carrier 20 travelling on a supporting track 26 composed of a pair of facing channel members, the carrier consisting of a front trolley 22 and a rear trolley 24 connected together by a load bar 28. The drive dog 18 of the front trolley may be movable to a non-driving position relative to a pusher 16 by operation of a dog releasing lever 30 engaging an actuating cam 32 on the rear of the preceding carrier to provide for accumulation of carriers as more fully described in U.S. Patent No. 3,044,416.

The load carrying portion 34 of the carrier includes a transversely offset vertical frame 36 connected at its lower end to a horizontal transverse frame member 38 which supports a load platform 40, and a transverse pivot pin 42 connects the upper end of the vertical member 36 to the load bar 28.

FIG. 1 shows the carrier 20 stopped by the apparatus of the invention at a station where some operation is to be performed. Forward movement of the carrier has been arrested first by the combination of a stop plate 44 and anti-backup pawl 46, the stop plate 44 being moved by suitable actuating means (not shown) into the path of travel of the carrier driving dog 18, disengaging the driving dog from the pusher 16 and stopping the carrier by abutment with a holdback dog 48. A stop construction of this type is more particularly described in U.S. Patent 3,229,645, although other means may be employed for disengaging the carrier drive dog from the pusher and stopping the carrier. When forward movement of the carrier is thus abruptly halted, the momentum of the load carrying portion 34 sets up a forward and backward rocking movement of the load carrying portion about the pivot 42, the load carrying portion first rocking forward and then pendulously backward. This rocking movement is eliminated and the carrier brought to a complete stop at a fixed location by the mechanism best illustrated in FIGS. 3 and 4.

Referring to FIG. 3, the mechanism shown is a motion damping device operable to restrain backward rocking movement of the load carrying portion of the carrier and consists of a shock absorber 50 and a shock absorber actuating arm 52. The shock absorber 50 is secured to a base plate 53 and has a vertically moving plunger 54 which is normally in the position indicated in broken line. The actuating arm 52 is pivotally mounted on a shaft 56 suitably supported on the base plate and has a counterweighted portion 58 overlying the end of the plunger 54, thus normally positioning the actuating arm as shown in broken line with a roller 59 on the end of the actuating arm extending into the path of movement of the transverse frame member 38 of the carrier, and free to pivot in a clockwise direction out of contact with the shock absorber when engaged by the frame member 38 moving in the forward direction. When the carrier is stopped, frame member 38 swings in a forward direction past the actuating arm 52 which then positions itself in the path of movement of the frame 38 on the ensuing backward rocking movement thereof. Thus the actuating arm 52 is engaged on the first backward swing of the carrier and this swinging movement is dampened or restrained by the shock absorber 50.

Referring now to FIG. 4, the mechanism shown arrests rocking movement of the load carrying portion of the carrier and is operable in response to operation of the motion damping device shown in FIG. 3. The mechanism of FIG. 4 includes a pair of one-way stops 60 (see FIG. 2) mounted on the shaft 56, and each including a counterweighted portion 61 and a carrier engaging portion 62. The stops 60 are normally urged by their counterweight portions 61 to the full line position shown but are free to pivot to permit passage of the carrier frame 38 moving in a forward direction. When the load carrying portion of the carrier begins its first backward rocking movement, the stops 60 act in conjunction with the shock absorber device of FIG. 3 to limit backward rocking movement of the load carrying portion. Any further forward rocking movement is arrested by operation of a clamp arm 64 which is pivoted at 65 and moved to and from the normal position shown in broken line by a fluid pressure actuating cylinder 66. Operation of the cylinder 66 takes place in response to operation of the shock absorbing device, and in the construction shown this is accomplished by a limit switch 68 (FIG. 3) positioned to be contacted by the shock absorber actuating arm on the shock absorbing movement thereof resulting from rearward rocking movement of the carrier, control over the cylinder 66 being effected through a solenoid valve (not shown). When the cylinder 66 is actuated, the clamp 64 is moved into engagement with the frame member 38 of the load carrying portion of the carrier and urges the frame member in a backward direction against the action of the shock absorbing device, clamping the frame member against the stops 62 with a cushioned motion arresting action.

It will thus be seen that when the carrier is stopped, the momentum of the load carrying portion thereof is in part absorbed by the first forward rocking movement and on the first backward rocking movement is dampened and snubbed with minimal shock on the load carrying portion and any load thereon, and with the load carrying portion firmly and accurately positioned relative to the station.

While preferred embodiments have been described above in detail, it will be understood that numerous modifications might be resorted to without departing from the scope of the invention as defined in the following claims.

We claim:

1. Apparatus for arresting movement of a conveyor carrier propelled along a supporting track by a driven pusher engaging a drive dog on the carrier, the carrier having a load carrying portion suspended from a pivot for rocking movement about an axis transverse to the direction of travel, comprising:
    means for disengaging the carrier drive dog from the pusher and stopping the carrier resulting in forward and backward rocking movement of the load carrying portion about said pivot,
    a motion damping device operable to restrain backward rocking movement of the load carrying portion of the carrier;
    and mechanism for arresting rocking movement of the load carrying portion of the carrier operable in response to operation of the motion damping device.

2. Apparatus as claimed in claim 1 whertin the mechanism for arresting rocking movement includes a member movable into engagement with the load carrying portion of the carrier to urge said portion in the backward direction against the motion damping device.

3. Apparatus as claimed in claim 1 wherein the mechanism for arresting rocking movement includes a one-way stop engageable by the load-carrying portion of the carrier to limit rocking movement thereof in the backward direction, and a member engageable with the load carrying portion of the carrier to position the same against said one-way stop.

4. Apparatus as claimed in claim 1 wherein the motion damping device includes a shock absorber and a shock absorber operating arm engageable by the load carrying portion of the carrier to move the shock absorber on a motion restraining stroke in response to backward rocking movement of the load carrying portion of the carrier.

5. Apparatus as claimed in claim 4 wherein the mechanism for arresting rocking movement includes a stop engageable by the load carrying portion of the carrier to limit backward rocking movement thereof and movement of the shock absorber actuating arm resulting from such backward rocking movement.

6. Apparatus as claimed in claim 5 wherein the mechanism for arresting rocking movement includes means clamping the load carrying portion of the carrier against said stop.

7. Apparatus as claimed in claim 6 wherein the means clamping the load carrying portion of the carrier against the stop includes a clamp arm, and actuating means for moving the clamp arm into engagement with the load carrying portion of the carrier in response to shock absorbing movement of the shock absorber.

8. Apparatus for arresting movement of a conveyor carrier propelled along a supporting track by a driven pusher engaging a drive dog on the carrier, the carrier having a load carrying portion suspended from a pivot for rocking movement about an axis transverse to the direction of travel, comprising:
    stop means for disengaging the carrier drive dog from the pusher and stopping the carrier resulting in forward and backward rocking movement of the load carrying portion about said pivot,
    means to restrain and limit backward rocking movement of the load carrying portion of the carrier;
    mechanism for arresting forward rocking movement of the load carrying portion of the carrier, and means for operating the arresting mechanism in response to rearward rocking movement of the carrier.

9. Apparatus as claimed in claim 8 wherein the means for restraining and limiting backward rocking movement of the load carrying portion of the carrier comprises a shock absorber, a shock absorber actuating arm engageable by the load carrying portion of the carrier on backward rocking movement thereof to operate the shock absorber on a working stroke, and a stop engageable by the load carrying portion of the carrier to limit backward rocking movement thereof.

References Cited

UNITED STATES PATENTS 3,170,412  2/1965  Sowder _____ 104—173

ARTHUR L. LA POINT, *Primary Examiner.*

D. F. WORTH, *Assistant Examiner.*